Patented Oct. 10, 1933

1,929,442

UNITED STATES PATENT OFFICE 1,929,442

PROCESS FOR OBTAINING ORTHOPHOSPHORIC ACID AND/OR CONVERSION PRODUCTS THEREOF

Charles H. Milligan, Newark, N. J., assignor to The American Agricultural Chemical Company, a corporation of Delaware No Drawing. Application August 26, 1930
Serial No. 477,983

6 Claims. (Cl. 23—165)

My invention is applicable generally to the recovery of orthophosphoric acid and/or conversion products thereof, from materials containing inorganic phosphates or acid phosphates. Suitable materials are: animal bone matter, deposits containing recent or fossil bone matter, mineral deposits containing phosphates of any kind, such as apatite, and artificial materials, such as superphosphates.

The first step in my process consists in treating the raw material with sulphuric acid of a concentration appropriate to replace and liberate the combined phosphoric acid with the resultant formation of free phosphoric acid. While I may employ any concentration of sulphuric acid which will accomplish this purpose, I find acid of from 25 to 93%, $H_2SO_4$ content, to be effective, and prefer acid of from 50 to 80%, $H_2SO_4$ content, for example 75%. The amount of acid to be applied must be sufficient to form orthophosphoric acid, and for maximum recovery should be sufficient to convert the major part of the combined phosphoric acid to this form. An excess of sulphuric acid over the theoretical may be employed where it is desired to recover substantially all of the combined phosphoric acid present in the raw material. The mixture of acid and raw material is preferably denned to complete the reaction.

When a sulphuric acid of this strength is admixed with a raw material of the type described, the result is a pasty mixture of gangue or earthy material carrying the soluble reaction products disseminated throughout the mass, and in a form such that selective separation is difficult. A commercial separation has heretofore been achieved by water extraction with the consequent solution of the soluble phosphates together with the simultaneous removal either in suspension or solution of substantial proportions of other materials present in the ore, or formed by the acid reaction.

In accordance with my invention, I effect this separation by contacting the mixture of reaction products and insoluble material with an extraction liquid, predominantly organic, which is water immiscible and is a solvent for orthophosphoric acid.

Without excluding other advantages resulting from this treatment, I may specifically mention the fact that a solution of the type described permits a more effective separation of undissolved materials, which would be carried forward in an aqueous solution, and also inhibits the solution tendency of other undesired compounds which possess an appreciable solubility in aqueous solutions of phosphoric acid. While this effect may be obtained in a degree by the use of extracting solutions containing an organic component, even though the solution is water miscible, it is effected in a greater and more marked degree by solutions which are water immiscible. In addition, the use of a water immiscible extraction liquid permits particularly simple and economical methods of separating the orthophosphoric acid and/or the conversion products thereof, from the extraction liquid, and also provides processes by which the extraction liquid may be recycled and repeatedly employed. I may, for the purpose of this application, define a water immiscible liquid to be one which is not soluble in water or aqueous solutions of phosphoric acid in excess of 10% by weight of the total, although a solubility under 2% is desirable. A converse tendency of water to dissolve in the extracting liquid is not ordinarily detrimental, provided the extracting liquid does not thereby acquire water solubility in excess of the limit hereinabove mentioned.

I have found, however, that where the sulphuric acid applied to the phosphate containing material is theoretically sufficient to combine with the bases present, either free or combined with other acids than sulphuric oxide, the extraction liquid separates a phosphoric acid which is relatively free from materials other than phosphoric acid formed by the action of the sulphuric acid on the raw material, but may contain sulphuric acid which is difficult to selectively eliminate from the extraction liquid. I have further found that by limiting the amount of inorganic acid so that it is less than theoretically necessary to combine with the bases present, either free or combined with other acids than sulphuric oxide, the extraction liquid may be caused to separate a relatively pure phosphoric acid free from the applied sulphuric acid. Any reduction from the theoretical will prove beneficial, and by a relatively slight reduction the extraction liquid may be caused to extract a phosphoric acid which is either free from the inorganic acid or in which the sulphuric acid is present in amount so small as not to be detectable by the usual analytical methods.

In order to produce a satisfactory yield of phosphoric acid, the sulphuric acid should be applied in amounts approaching the theoretical. The formation of phosphoric acid from a raw material containing neutral phosphates, for example, may be assisted by the addition of sulphuric acid sufficient to combine even with relatively weak bases which are simultaneously present. Where sulphuric acid is employed the mixture is preferably defined at a temperature in excess of 75° C., for a period of several hours, to permit the reaction to proceed, and during this stage volatile acids may be generated and thrown off by the action of the sulphuric acid on salts of volatile acids which are present in the raw material. For these reasons the amount of sulphuric acid applied should approach that theoretically necessary to combine with the bases present, either free or combined with other acids than sulphuric oxide. The exact reduction from the theoretical necessary to yield a phosphoric acid of the desired purity may, in this case, be determined by a series of preliminary tests in which various amounts of sulphuric acid less than the theoretical are mixed with test batches of the raw material. Such batches should be held at a temperature of at least 75° C. for several hours, and thereafter extracted with an extraction liquid of the type hereinbefore described. By analytical tests applied to the material so extracted, it may be easily determined when the desired freedom from sulphuric acid has been achieved, and the same relative proportion of sulphuric acid may then be applied industrially with the consequent recovery of phosphoric acid of corresponding relative purity.

Such an extraction liquid may consist of a single organic substance which is water immiscible, and is alone a solvent for orthophosphoric acid. The extraction liquid may also be made up predominantly of substances, which are of this character, with minor proportions of other substances where the mixture so produced is water immiscible and is a solvent for orthophosphoric acid. The other substance present may either be water miscible or water immiscible, and in the latter case may alone be incapable of dissolving orthophosphoric acid. Certain water immiscible substances, such as, for example, hydrocarbons, either aromatic or aliphatic, and/or their derivatives, may be added with advantage where the proportion is not so great as to seriously diminish the capacity of the solution to dissolve orthophosphoric acid. It may also be possible to so combine a water miscible organic substance, which is a solvent for orthophosphoric acid, with a water immiscible organic substance, which is not a solvent for orthophosphoric acid, as to produce an extraction liquid which is water immiscible and possess the desired capacity to dissolve orthophosphoric acid.

All such mixtures and/or pure substances are comprehended within the scope of my invention.

The extraction liquid may, of course, be made up by selecting and/or combining organic compounds, which individually possess the desired properties, viz, which are alone water immiscible and dissolve orthophosphoric acid.

In the course of my experiments, I have found that numerous organic liquids, which are not water miscible, are efficient solvents for orthophosphoric acid and may be utilized for this purpose. The oxygenated hydrocarbon liquids, particularly those of lower molecular weight, appear generally to possess this property, although somewhat in varying degree, and inasmuch as it is obviously impossible to examine each and every of the organic liquids in this connection and would be a matter of great difficulty to examine all of the oxygenated hydrocarbons, I may state that the water immiscible extracting liquid may be made to consist predominantly of a substance or substances selected from water immiscible oxygenated hydrocarbon liquids. By liquids I mean those substances which are fluid at or near normal temperature, say below 50° C.

I have found preferable, an extraction solution consisting predominantly of the water immiscible oxygenated hydrocarbon liquids of not exceeding 8 carbon atoms in the chain carrying the oxygen group, and while I believe that all of these compounds may be employed either alone or in various mixtures, I may again state that the extraction liquid will in this case consist predominantly of a substance or substances selected from this class. I have, for example, successfully employed ketones, acids, aldehydes, ethers, aliphatic and aromatic alcohols of not exceeding 8 carbon atoms in the chain carrying the oxygen group, and in the chain carrying the hydroxyl group in the alcohols. In particular I prefer, and have found eminently suitable, all of the water immiscible aliphatic alcohols not exceeding 8 carbon atoms to the molecule. This includes, for example, primary and secondary butyl alcohol, as well as the primary, secondary and tertiary amyl, heptyl and hexyl alcohols.

Satisfactory results have been obtained by the use of amyl alcohol, and the term "amyl alcohol" may be hereinafter employed to denote any of the pure amyl alcohols and/or any mixture of the isomeric amyl alcohols.

I further find it of advantage to limit the amount of extraction liquid so that it does not exceed ten times the weight of the material with which it is contacted, viz, of the raw material plus the reaction products of the sulphuric acid treatment. By limiting the amount of extraction liquid in this manner, the extraction of phosphoric acid may be incomplete and it may be desirable to subsequently wash the undissolved material with water for the separation of an additional quantity of phosphoric material of lesser purity. However, by so limiting the amount of extraction liquid applied, it is possible to inhibit the solution of other materials than phosphoric acid formed by the action of the sulphuric acid on the raw material, with the result that the dissolved phosphoric acid is of extremely high grade. A slightly greater purity may be obtained by limiting the extraction liquid so that it does not exceed five times the weight of the raw material to which it is applied.

After the extraction liquid has been contacted with phosphatic material from the mineral acid treatment, the extraction liquid may be separated in any suitable manner, as, for example, decantation, filtration or centrifuging.

The last traces of the extraction liquid may be recovered by steaming the residue of undissolved material. If desired, a water wash may be thereafter applied to the residue for the purpose of separating an additional quantity of material of lesser purity which may contain orthophosphoric acid and/or acid phosphates.

Various methods are available for the recovery of the phosphoric acid or conversion products thereof from the extraction liquid. The extraction liquid may be separated by distillation without preliminarily neutralizing the orthophosphoric acid, but in this case at least a part of the organic material in the extraction liquid may be broken down due to the dehydrating effect of the orthophosphoric acid. Where the extraction liquid contains alcohol, for example, it may be in part broken down during the distillation with the resultant conversion of part thereof into olefines, ethers may also be present. In this case the olefines and/or ethers may be separated by rectification, and utilized as such if desired, or alternatively the olefine material may be reacted with appropriate concentrations of aqueous sulphuric acid to form alkyl sulphates, which are then hydrolyzed to reform the alcohol.

It is also feasible to either completely neutralize the phosphoric acid, employing, for example, sodium carbonate, and/or hydroxide, or to carry the neutralization to the point at which little or no free orthophosphoric acid is left. This neutralization may, for example, be carried to the point at which the orthophosphoric acid is completely converted to tri-sodium phosphate, or may only be carried to the point at which the material is converted to monosodium phosphate. If the anhydrous salt is required, the extraction liquid may be then distilled to dryness; whereas if an aqueous solution is desired, the distillation may be carried only to the point of removing the organic component of the extraction liquid. Crystallization may alternatively be employed to separate the dissolved phosphoric compound, and in this case the orthophosphoric acid in the extraction liquid may be neutralized with ammonia.

It is also feasible to neutralize the orthophosphoric acid with a base producing a salt, which separates from the extraction liquid by precipitation, and thereafter to recover the extraction liquid by decantation or filtration. Precipitation of the phosphoric acid present may be accomplished by converting the phosphoric acid present into a sodium salt, such as mono or di sodium phosphate. I am not limited to the sodium phosphates, but may correspondingly form any alkakli metal phosphate. The sodium phosphate, for example, may be formed by adding sodium hydroxide, sodium carbonate or any other suitable basic material, and the sodium salts, or for that matter any desired salts, may be formed by adding the corresponding metallic ion combined with a weak organic acid. The same result may, of course, be obtained by converting the phosphoric acid into salts which are not normally water soluble or are not highly water soluble, such as, for example, mono or di calcium phosphate. It will be apparent in the foregoing that I may separate the phosphoric acid from the extraction liquid by converting it into neutral mono or di phosphates of any inorganic base. The term "phosphates" as herein employed, shall embrace the neutral phosphates and also the acid phosphates.

The procedure which I have invented also comprehends a very simple and economical mode of separation of the phosphoric compounds from the extraction liquid, for on contacting the water immiscible extraction liquid with water the phosphoric acid passes into the water layer. With certain extraction liquids the orthophosphoric acid will pass almost completely into the water phase, and with other extraction liquids of the type hereinbefore described, a partition will result in which the phosphoric compounds ordinarily pass predominantly into the water layer. For this purpose I preferably operate with at least an equal volume of water for each volume of extraction liquid, and I find it advisable to so adjust the volume of the water as to produce a concentration of orthophosphoric acid therein in excess of 15% by weight, say between 15% and 30%. This process is not limited to the separation of orthophosphoric acid from the extraction liquid, for if desired, the orthophosphoric acid may be converted into any other water soluble form by appropriate treatment in the extraction liquid, and thereafter separating in the converted form by contacting the extraction liquid with water.

After contacting the extraction liquid with water it may ordinarily be recycled without further treatment, and utilized directly for the extraction of further batches of phosphoric material which have been treated with mineral acid. The orthophosphoric acid separated in the water phase may either be utilized as such, or converted by suitable treatment into any other form required by the market.

Another mode of recovering the phosphoric compounds from the extraction liquid consists in adding to the extraction liquid a second substance or substances, preferably liquid, which is soluble therein, but which is not per se a solvent for orthophosphoric acid, or which dissolves orthophosphoric acid to a much lesser extent than the extraction liquid. The hydrocarbons, and particularly the light hydrocarbons, say for example those of less than 15 carbon atoms to the molecule, are suitable for this purpose. The preferred liquid is benzol. The extent to which the orthophosphoric acid is thrown out of solution in the extraction liquid is a function of the amount of the second liquid added, and the extent to which it is desirable to carry the separation may be determined in any case by balancing the extent of recovery against the cost of separating the second liquid. It is of course desirable to so choose the second liquid that it may be cleanly separated from the water immiscible solvent by recification. For this reason the second liquid should have a boiling point differing by at least 8° C. from the boiling point of the water immiscible solvent, and preferably should not form constant boiling mixtures with the same. The orthophosphoric acid is thrown out of solution in the extraction liquid in the form of a concentration aqueous solution, and this mode of separation is particularly desirable where a concentrated orthophosphoric acid is required.

The foregoing description is for purposes of illustration and not of limitation, and it is therefore my intention that the invention be limited only by the appended claims or their equivalents in which I have endeavored to claim broadly all inherent novelty.

I claim:

1. Process of obtaining phosphoric acid or conversion products thereof from materials containing inorganic phosphates, which comprises admixing a phosphate containing material with sulphuric acid of from 25 to 93%, $H_2SO_4$ content, in quantity sufficient to form orthophosphoric acid, thereafter contacting the admixed materials with an extraction liquid consisting predominantly of a substance or substances selected from the water immiscible oxygenated hydrocarbon liquids of not exceeding 8 carbon atoms in the chain carrying the oxygen group, which extraction liquid is water immiscible and is a solvent for orthophosphoric acid, thereafter separating said extraction liquid and dissolved phosphoric acid from undissolved materials, and removing the dissolved phosphoric acid or conversion products thereof from said extraction liquid.

2. Process according to claim 1, in which the dissolved phosphoric acid is removed from said extraction liquid by contacting said extraction liquid with water.

3. Process according to claim 1, in which the dissolved phosphoric acid is removed from said extraction liquid by adding a hydrocarbon to said extraction liquid.

4. Process of obtaining phosphoric acid or conversion products thereof from materials containing inorganic phosphates, which comprises admixing a phosphate containing material with sulphuric acid of from 25 to 93%, $H_2SO_4$ content, in quantity sufficient to form orthophosphoric acid, but less than the quantity of sulphuric acid required to combine with the bases present in the material, either free or combined with other acid than sulphuric oxide, thereafter contacting the admixed materials with an extraction liquid consisting predominantly of a substance or substances selected from the water immiscible oxygenated hydrocarbon liquids of not exceeding 8 carbon atoms in the chain carrying the oxygen group, which extraction liquid is water immiscible and is a solvent for orthophosphoric acid, thereafter separating said extraction liquid and dissolved phosphoric acid from undissolved materials, and removing the dissolved phosphoric acid or conversion products thereof from said extraction liquid.

5. Process according to claim 4, in which the dissolved phosphoric acid is removed from said extraction liquid by contacting said extraction liquid with water.

6. Process according to claim 4, in which the dissolved phosphoric acid is removed from said extraction liquid by adding a hydrocarbon to said extraction liquid.

CHARLES H. MILLIGAN.